Patented Nov. 20, 1928.

1,691,965

UNITED STATES PATENT OFFICE.

AUGUSTE FERNBACH, OF PARIS, FRANCE, AND JOHN LEWIS YUILL, OF YORK, ENGLAND, ASSIGNORS TO ROWNTREE AND COMPANY LIMITED, OF THE COCOA WORKS, OF YORK, ENGLAND.

PROCESS FOR THE PRODUCTION OF CITRIC ACID.

No Drawing.    Application filed November 3, 1925.   Serial No. 66,665.

This invention relates to processes for the production of citric acid from cane sugar by means of fungi. In the present specification the term "Cane Sugar" is to be understood to mean sucrose whether obtained from sugar cane or from any other source.

It is well known that many fungi when grown upon solutions of sugar containing the necessary inorganic nutrient materials, convert part of the sugar into citric acid, and a number of processes for the production of citric acid by means of fungi have hitherto been proposed. For an account of the prior work in connection with the citric acid fermentation by means of fungi reference may be made to a paper by J. N. Currie published in the Journal of Biological Chemistry, Vol. XXXI, 1917, page 15, in which the author gives an account of his own experiments and also refers to the work of others particularly Wehmer and Zahorski. Various difficulties have, however, been encountered when the citric acid fermentation has been attempted on a commercial scale, one of the chief difficulties being that of preventing the media from becoming infected by organisms which interfere with the citric acid fermentation. When working on a laboratory scale this difficulty is easily overcome, for the liquor to be fermented may be sterilized in the same vessel as that in which it is to be fermented, usually a small glass vessel. Sterilization is thus accomplished without risk of contaminating the solution by metallic or other impurities and further, there is little risk of subsequent infection by foreign micro-organisms. When working on a commercial scale, however, the sterilization of the liquor by means of heat gives rise to grave difficulties for the selected moulds are very sensitive to traces of metallic and other impurities difficult to avoid in such large scale sterilization and may easily have their fermentation value reduced to a trifling amount by the presence of such impurities. Moreover, if this step could be carried out without any material change in the composition of the medium there still remains the danger of infection by micro-organisms subsequent to cooling or to inoculation. On the other hand, if sterilization be omitted, the growth of the desired organism will almost certainly become invaded by the development of foreign organisms present at the time of inoculation or entering the solution subsequently; such organisms may be either bacteria, yeasts or yeast-like organisms, or other fungi.

The existence of the aforesaid difficulty has, of course, been recognized and in the aforesaid paper it is suggested by the author that the danger of infection may be greatly reduced if a small quantity of hydrochloric acid be added to the solution, the effect of which is to make complete sterilization possible at a single heating in steam at atmospheric pressure for 30 minutes. It is to be observed, however, in this connection that the author was working only on a small scale using not more than a litre of solution for each experiment.

There is a further disadvantage incidental to sterilization by heat namely that it tends to promote hydrolysis.

Now the object of the present invention is to provide an improved process for the production of citric acid from cane sugar by means of fungi, which may be carried out efficiently on a commercial scale with a good yield.

It is to be understood that "a commercial process" or "working on a commercial scale" means that the process may be carried out in large vessels containing several hundred litres or more of fermentable solution, as distinguished from a "laboratory scale" when small vessels containing only one or a few litres are employed. Although the present process is intended particularly for working on a commercial scale it may, of course, also be worked on a smaller or laboratory scale.

In order to provide a commercial process the inventors based their experiments on the assumption that it would be necessary to protect the media from the risk of infection in some way other than by sterilization by heat, and they have found that comparatively large amounts of hydrochloric acid added to the solution are sufficient to render sterilization by heat unnecessary. The actual quantity of acid added depends to a certain extent upon the other constituents of the solution, but sufficient acid should be added to raise the hydrogen ion concentration of the medium to such a point that not only bacteria but yeast and a great majority of other fungi are inhibited whilst the selected organism is not inhibited. Further, in order to obtain good yields, the inventors have found that it is desirable to select particular strains of fungi which give indications of good citric acid producing capacity and to cultivate them, preferably, on a neutral medium.

In the process according to the present invention, therefore, the liquors to be fermented instead of being subjected to sterilization by heat, are treated with comparatively large amounts of hydrochloric acid preferably prior to inoculation, and are incubated with the spores of fungi, preferably from strains which are selected for their citric acid producing capacity and have been cultivated on a neutral medium. It is to be understood that although the quantity of acid added is so great that no sterilization by heat is necessary, nevertheless, the application of heat to the liquors to be fermented, though neither necessary nor desirable, is not excluded from the scope of this specification. Obviously, if heat be applied, it should be insufficient to cause the liquor to become contaminated by impurities derived from the containing vessel or, for reasons hereinafter stated, to cause the sugar to become hydrolyzed to any serious extent.

When carrying out citric acid fermentation processes on a commercial scale a further difficulty is encountered which is due to the fact that the fungi employed only function as citric acid producers when growing on the surface of the solution, and, since the diffusion of citric acid formed in the neighbourhood of the mould downwards and of fresh sugar upwards does not naturally take place rapidly, the deeper layers remain more or less unaffected. This difficulty does not obtain when working on a laboratory scale with shallow layers of liquid. In order to overcome this difficulty, in accordance also with the present invention, the whole of the solution is brought as far as possible into contact with the mould. This may be accomplished in various ways, for instance, by establishing differences of temperature on opposite sides of the vessel, and so causing a suitable convection; or by pumping the liquid round: or by simple stirring underneath the mould; or by rotating the containing vessel, or in any other convenient way.

The new process may be made a continuous or partially continuous process until the mould is exhausted. To this end, in accordance with the invention, fresh sugar may be added to the solution during the course of the fermentation, thereby virtually increasing the capacity of the vessels. The sugar may be added continuously or intermittently with or without the withdrawal of citric acid liquor, and up to a certain point such addition contributes to a better utilization of the sugar for citric acid. Fresh nutrients may also be added in the same way, either alone or together with fresh sugar.

The following is a description of the manner in which the invention may be carried into effect and is given by way of example.

*Species of moulds or fungi employed.*

The moulds or fungi preferably employed are some of the dark-coloured aspergilli. These organisms whose mature conidia may be brown, brownish-black, purplish-black or dead black occur widely distributed in nature and a convenient source is found in the fruits etc. of plants growing in warmer parts of the earth; for example, they are commonly found on coffee beans and inside certain plant galls. While these fungi usually give the best yield of citric acid from cane sugar they will also produce considerable amounts from other substances such as invert sugar, glucose, laevulose, maltose and glycerol, but sensible amounts of citric acid have not been obtained from lactose.

The preferred organisms may be recognized by the fact that they are aspergilli with dark-coloured conidia, capable of germinating in sugar solutions containing suitable nutrients together with comparatively high concentrations of hydrochloric acid, and capable of producing citric acid from cane sugar in amounts represented by up to 65% on the sugar used, expressed as crystalline citric acid. They produce under the same conditions negligible traces of other acids.

*Selection and cultivation of the spores.*

A number of aspergilli obtained as aforesaid are isolated in pure culture and cultivated, for example, on a medium which favours the production of a thick growth of spores, such as a medium rich in starch. Small amounts of sugar solution acidified with hydrochloric acid and containing the common nutrient salts for fungi are then inoculated with the spores and incubated at, say 30° C. till the bulk of the sugar is exhausted. Those particular strains which give indications of the greatest citric acid capacity, and do not produce or accumulate other acids under these conditions are then selected from a number of such cultures. Then from the parent cultures from which the selected cultures were derived a number of sub-cultures are made, again on neutral media favouring spore production, in order to raise enough spores for the inoculation of larger bodies of sugar solution for the production of citric acid. These cultures are then incubated at a suitable temperature which may lie between 10° and 40° C. The aspergilli employed give good results without being cultivated for seed upon an acid medium, but such a medium may be employed.

*Preparation and inoculation of the solution.*

A solution of cane sugar having an original strength of 10–20% of sugar is prepared and to it are added the necessary nutrient materials such as ammonium nitrate, potassium phosphate and magnesium sulphate, together with a comparatively large amount of hydrochloric acid. The amount of acid added may be varied according to the conditions as above explained, i. e., the solution should be made sufficiently acidic to exclude invading organisms without inhibiting the growth of the citric acid-producing fungi used. In general, the desired acidity of the solution, expressed in terms of hydrogen ion concentration, will be found to lie within the range $pH=1.2$ to $pH=2.5$. For example we have found that an amount may be added which will give a hydrogen ion concentration corresponding to $pH=1.8$ without inhibiting the growth of the selected aspergilli or decreasing the yield of citric acid. Few other organisms can flourish in such a solution. The solution is then incubated at a temperature of 10°–40° C. until the stage is reached at which the citric acid content of the solution no longer increases. In general the length of incubation required decreases with rise of temperature, but at the higher temperatures the yield is liable to suffer. When the production of citric acid is complete the liquor may be separated, neutralized with lime, or chalk, or other compound, and the calcium or other salt of citric acid be precipitated and the acid recovered by decomposition of this in the usual way; or the liquor may be used direct as a solution of citric acid, or the liquor may be concentrated direct by evaporation, to give crystals of citric acid, which may or may not require further purification.

It has been found that a better yield of citric acid results when the inversion of the cane sugar takes place gradually, mainly due to the activity of the mould, and is not previously effected by other agencies. The new process therefore possesses three distinct advantages, sterilization by heat is rendered unnecessary; the risk of subsequent invasion by other organisms is reduced to a minimum and a better yield results than if, as suggested by the author of the paper hereinbefore referred to, the solution be boiled in the presence of a small quantity of hydrochloric acid, during which some of the cane sugar would be hydrolyzed.

At the completion of the process there is usually a little residual sugar, while starch also is formed in solution under the conditions of this process. The residual sugar may, after suitable treatment of the solution, be fermented by means of yeasts or yeast-like organisms and the starch first simplified or reduced by hydrolysis in any suitable manner and then fermented without appreciable loss of acid. If it is desired, the volatile products may then be removed by boiling. A considerable further quantity of citric acid is recoverable from the fungus and may be extracted simply by allowing it to diffuse into water or in any other suitable way.

We claim:—

1. Process for the production of citric acid from solutions of cane sugar containing the necessary nutrient materials by means of fungi, which comprises adding to the solution hydrochloric acid in quantity sufficient to raise the hydrogen ion concentration to a point lying within the range $pH=1.2$ to $pH=2.5$, whereby sterilization of the solution by means of heat is rendered unnecessary.

2. Process for the production of citric acid from solutions of cane sugar containing the necessary nutrient materials by means of aspergilli, which comprises adding to the solution hydrochloric acid in quantity sufficient to raise the hydrogen ion concentration to a point lying within the range $pH=1.2$ to $pH=2.5$ whereby sterilization of the solution by means of heat is rendered unnecessary.

3. Process for the production of citric acid from solutions of cane sugar containing the necessary nutrient materials by means of aspergillus niger, which comprises adding to the solution hydrochloric acid in quantity sufficient to raise the hydrogen ion concentration to a point lying within the range $pH=1.2$ to $pH=2.5$ whereby sterilization of the solution by means of heat is rendered unnecessary.

4. Process for the production of citric acid from solutions of cane sugar containing the necessary nutrient materials by means of aspergilli, which comprises adding to the solution hydrochloric acid in quantity sufficient to raise the hydrogen ion concentration to a point lying within the range $pH=1.2$ to $pH=2.5$, whereby sterilization of the solution by means of heat is rendered unnecessary, and incubating said solution with the spores of selected strains of aspergilli cultivated on a neutral medium.

5. In processes for the production of citric acid from solutions of cane sugar containing the necessary nutrient materials by means of fungi, involving the operation of adding to the solution hydrochloric acid in quantity sufficient to raise the hydrogen ion concentration to a point lying within the range $pH=1.2$ to $pH=2.5$, the step which consists in bringing the whole of the solution, as far as possible, into contact with the fungi.

AUGUSTE FERNBACH.
JOHN LEWIS YUILL.